Patented Aug. 22, 1939

2,170,152

UNITED STATES PATENT OFFICE 2,170,152

STABLE BITUMINOUS EMULSION AND PROCESS OF PREPARING THE SAME

Claude L. McKesson, San Francisco, Calif., assignor to American Bitumuls Company, San Francisco, Calif., a corporation of Delaware No Drawing. Application June 2, 1936, Serial No. 83,059

8 Claims. (Cl. 134—1)

This invention relates to the stabilization of "quick-breaking" bituminous emulsions. It involves the addition of certain naturally occurring milk proteins, unaltered by the action of acids or enzymes such as rennet and in either a concentrated or dried form, to emulsions in order that they will remain stable to mixing with electrolytes over long periods and will be rendered resistant to breakdown, separation or inversion of phase.

Emulsions generally designated and understood in the trade as "quick-breaking", are those which tend to break down or separate into agglomerated masses when diluted with water, contaminated with electrolytes or other foreign matter. Such emulsions are often made by emulsifying bituminous materials in an aqueous caustic alkali solution, the caustic alkali forming with the natural acids occurring in the bitumen a reaction product which acts as an emulsifying agent. Such a process is disclosed in United States patent to Braun, No. 1,737,491, and also in a patent to Montgomerie, No. 1,643,675. The alkali solution in which the bituminous material is dispersed may contain either caustic soda or potash, sodium carbonate, sodium metasilicate, tri-sodium phosphate or other equivalents.

An object of my invention is to provide a method of manufacturing bituminous emulsions capable of mixing with aggregates or applying to surfaces without premature breakdown.

Another object is to devise a method of protecting emulsions against premature breakdown due to the addition of water or electrolytes and other foreign materials.

Another object of the invention is to devise a method of stabilizing quick-breaking bituminous emulsions with naturally occurring milk proteins so that the emulsion will retain its stability over long periods of storage and under widely divergent temperature conditions.

Another object is to produce an emulsion capable of being troweled or brushed, alone or in admixture with other materials.

Still another object is to disclose a novel method of using naturally occurring proteins for stabilizing bituminous emulsions and preventing breakdown by bacteriological or chemical decomposition.

An additional purpose is to prevent deterioration of a protein stabilized bituminous emulsion by either bacteriological action or by heat, with the addition of a single chemical agent.

A still further purpose is to provide a bituminous composition that shall remain flexible throughout its life as well as resist sunlight, weather, oxidation, and which will not soften to the flowing point even under high temperatures.

These and other objects will be apparent from the following description of the problem and its solution, together with the typical example of a method for carrying out the process.

It is known to produce stabilized alkaline bituminous emulsions by the addition of commercial casein or of sodium caseinate. More recent developments have shown that it is necessary to carefully adjust the pH concentration of the alkali to obtain a bituminous emulsion having satisfactory mixing properties which will be retained in storage. Such a process has been disclosed in the United States patent of Vilas E. Watts, No. 2,040,115, issued May 12, 1936 and assigned to the same assignee as the present application.

Attention is directed to the fact that the protein actually occurring in milk which yields commercial casein is a material distinctly different from commercial casein itself. To avoid confusion of commercial casein with the materials used in the present invention, the terminology suggested by Van Slyke & Hart at page 496 of the American Chemical Journal, volume 33, published by Eschenbach Printing Company, Easton, Pennsylvania, in 1905, will be adopted. Accordingly, (1) The compound existing in milk will be called "calcium casein".

(2) Only the free proteid will be called casein.

(3) The compound formed by precipitation from milk with an acid will be called the casein salt of the acid used.

(4) The compound formed by coagulation from milk with the enzyme rennet will be designated "coagulated calcium paracasein".

Commercial casein such as that disclosed in British Patent No. 411,312 to International Bitumen Emulsions Limited and in the above cited Watts Patent No. 2,040,115 is commonly prepared by one of three processes. (See Fundamentals of Dairy Science by Associates of Rogers, page 53, published by the Chemical Catalog Company, 419 4th Avenue, New York, in 1928.) These processes involve souring of milk which yields casein lactate and possibly some free casein if the souring is not carried far enough to free sufficient lactic acid to react with all the casein; or, precipitation with hydrochloric acid which yields casein chloride; or they involve the action of the enzyme rennet which yields coagulated calcium paracasein. The term commercial casein as used in this application or "casein" as used in every day practice designate either casein lactate, casein chloride, or other inorganic salts of casein and acid, or calcium paracasein.

I have found that "calcium casein" is a very efficient stabilizer for bituminous emulsions and that when this stabilizer is added to alkaline emulsions, lactose or milk sugars as found in skimmed milk, should be used to neutralize the excess alkali present in the emulsion to a critical pH range. By following this procedure, a given amount of stabilization against breakdown by electrolytes, fillers, etc. is obtained with approximately one-third the protein content required when commercial casein is used. If the method for adjusting the alkalinity of commercial casein stabilized emulsions such as in the Watts Patent No. 2,040,115 is used, the calcium casein and other naturally occurring milk proteins will lose their stabilizing effect very rapidly at elevated temperatures. The cause for this deterioration is not known, but is peculiar to certain naturally occurring milk proteins and has not been observed in the case of stabilization with commercial casein.

The chemical mechanism of the neutralizing action of the milk sugars has not been definitely established. However, it appears that the lactose of milk sugar is decomposed to lactic acid and/or other acidic decomposition products and that these decomposition products react with the alkali to neutralize it and to form a salt. Whatever the chemical action may be, this neutralization effect is preferable to and gives results not obtainable by neutralization with free inorganic acid. Although I am not precluded from adding "calcium casein" to a bituminous emulsion separately from the neutralizing agent milk sugar or lactose, it is preferred to add these materials simultaneously as they occur naturally in dried or concentrated skimmed milk.

In addition to the fact that the neutralization process above described avoids undue deterioration of the stabilizer in hot storage, the process is advantageous in that the acidic decomposition products of the milk sugars are generated in situ gradually and uniformly throughout the emulsion whereby the danger of partial breaking by sudden addition of free acids is avoided.

The rate of generation of the acidic decomposition products is readily controlled by regulating the temperature of the emulsion during the neutralization process. At temperatures above 100° F. neutralization is rather rapid and will have been completed within approximately twenty-four hours, or less. At temperatures below 100° F. the neutralizing action is much slower. Although the lower temperatures can be used, from the standpoint of commercial operation it is preferred to add the calcium casein and milk sugars to the emulsion at temperatures above 100° F. After neutralization to the desired pH has been reached the temperature of the emulsion should be controlled so that it will be less than 100° F. By utilizing this feature of temperature control, the emulsion is properly neutralized within desirable commercial periods and the stabilizing effect of the milk proteins is not materially decreased.

When neutralization is effected at temperatures lower than 100° F. much longer periods of time are required. This procedure is also less advantageous because the protein stabilizing agent is exposed to strong alkali for a corresponding longer period of time with the consequent deterioration of its effectiveness as a stabilizer. This mode of operation is, however, to be regarded as within the broader scope of my invention.

The preferred method of operation is carried out by addition of milk to a preformed quick-breaking emulsion while at a temperature of at least 100° F., allowing neutralization to occur until a pH in the range of 7.5–9.5 and preferably approximately 8.5 is reached, and controlling the temperature of the emulsion so that it reaches a point below 100° F. by the time the desired alkalinity has been attained.

For purposes of illustration a specific example of my process is given.

A quick-breaking bituminous emulsion having a pH of about 11.5 or more is prepared by any of the methods well known in the art, preferably such as disclosed in the Braun or Montgomerie patents previously cited. Dried skimmed milk is dispersed in water to form a 30% concentration. While the preformed bituminous emulsion is still hot from the manufacturing operation, usually at a temperature of between 165 and 175° F., the skimmed milk dispersion is added thereto in a quantity to give about 1% by weight of dried skimmed milk in the complete stabilized emulsion. The self neutralization phenomenon then sets in. As the emulsion cools the pH drops, due probably to the formation of lactic acids or other acids, to about 8.5. The emulsion should cool to at least 100° F. and preferably to substantially lower atmospheric temperatures, by the time the alkalinity of the emulsion reaches a pH of 8.5. If the cooling is not properly controlled and the emulsion allowed to remain at high temperatures for long periods after the alkalinity has been lowered to the desired point, a jell is formed.

When the alkalinity does not reach the exact point desired, as for instance, when insufficient milk sugar is present to neutralize the excess alkali, further final adjustments may be made by addition of small amounts of weak acid or of milk sugars. If neutralization has been carried too far, alkali may be added.

Addition of a buffer has been found very desirable to give still greater stabilization, particularly against jelling at temperatures above 100° F. Borax is suitable as a buffer and may be added in quantities up to 15% of the dry weight of the skimmed milk added as a stabilizer. This borax may be dissolved in the skimmed milk dispersion and added to the emulsion simultaneously with the milk or it may be introduced into the emulsion after the same has cooled and the alkalinity has reached the adjusted point.

Sodium arsenite is particularly desirable as a buffer in that it acts also as a preservative against bacterial action. When this material is used in quantities of 0.2–0.5%, preferably .25% by weight of the emulsion, borax need not be added to the emulsion.

Formalin in quantities of .2% to .5% by weight of the emulsion may be used as a preservative against deterioration by bacteria or mold, particularly where borax is used as a buffer.

Self neutralization in this type of emulsion is an important feature. By this neutralization the mixing properties of the emulsion are appreciably improved and the necessity for introducing acids for neutralization is generally avoided. The neutralization may be effected either by adding the skimmed milk to an emulsion hot from the manufacturing process or to an emulsion which has been cooled, stored and later reheated when it is desired to convert it to a stabilized mixing emulsion. The reheated emulsion should be at a temperature above 100° F. and preferably no higher than 175° F. in order to permit the self neutralization action to progress at a satisfactory rate. For the same reason temperatures higher than approximately 175° F. should also be avoided where the milk is added to an emulsion still hot from the manufacturing operation.

Although the specific example above given disclosed 1% by weight of dried milk in the emulsion, the quantity of stabilizer may be varied depending upon the degree of stability desired. As little as 0.1% dried skimmed milk based on the weight of the completed emulsion gives appreciable stabilization. To obtain thorough mixing properties, approximately 1% by weight is necessary. More than 1.5 to 2% is found to be unnecessary. It is possible to use skimmed milk with its natural water content, but is generally undesirable because of the large excess of water present. Likewise, it is generally undesirable to use whole milk because of the fats present. Skimmed milk concentrated by evaporation but not entirely dry is, of course, satisfactory.

While emulsions made by other processes may be employed in the present invention, the method finds its greatest utility when applied to the aforementioned quick-breaking Braun or Montgomerie emulsions which depend for emulsification on the interaction of materials contained in the bitumen with alkali in the aqueous phase. The upper limit of pH for these quick-breaking emulsions is generally in the order of 13.5, but is not critical for the purposes of the present invention so long as the preformed emulsion is itself satisfactory. Preferably, the pH should not be so high that the milk sugars alone cannot effect neutralization to the desired point of 8.5.

Emulsions made in accordance with the process of my invention are stabilized so that they may be mixed with electrolytes, combined with mineral aggregates or fibrous materials, or applied to surfaces, without breakdown or agglomeration even after long periods in transit or storage.

The above described emulsions stabilized with milk proteins and neutralized with milk sugars may be mixed with a mineral fibre such as asbestos and a pigment filler capable of functioning as a carrying agent, such as ground petroleum coke, iron oxide, chromium oxide, or limestone dust. The preferred method of admixing the emulsion with the pigment and fibrous material is to admix the pigment filler and fibrous material together and thereafter add the emulsion to the mixture while agitating, after which time additional water may be added to bring the composition to the desired consistency for placing in containers or otherwise storing. The preferred consistency is that which permits easy troweling.

A typical example of the proportions in which these materials may be satisfactorily mixed is as follows:

| | Percent |
|---|---|
| Emulsion (the emulsion having a bituminous content of 55 to 60%) | 45.4 |
| Pigment filler | 18.4 |
| Asbestos | 11.7 |
| Water, in addition to that naturally present in the emulsion | 24.5 |

It has been found that when a preformed quick-breaking emulsion is stabilized with dried milk, an emulsion is obtained that will retain its honeycomb structure even after the composition is laid, set and dried, and further even after the film has been subjected to weather and traffic. Therefore the mixture with pigment and filler does not form a homogeneous mass, but rather a heterogeneous mass of bitumen particles encompassed by a cellular structure of the stabilizer, all of which gives an unusual resiliency to the mass. Thus the milk protein may be considered as acting as a primary binder between the bitumen particles, in addition to such binding action as is contributed by the bitumen.

Some of the important features of the compositions containing fillers and pigments are that they can be thinned with water to any desired consistency, can be either troweled, painted or even sprayed, bond firmly to steel, galvanized iron, brass, concrete, wood or any firm surface, can be mixed with sand or cement without impairing their stability whereby a thicker and harder coating will be produced therefrom, dry quickly to a non-tacky coating, cannot be made to soften and run under any temperature after being applied, develop a great toughness when set, remain flexible throughout their life, resist sunlight, weather and oxidation, resist heavy or light traffic without destroying their resilient honeycomb structure, and protect the material over which they are placed against abrasion, decay, splintering or powdering. These compositions are very fire-resistant, substantially waterproof, can be used for coating walls, roofs and basements, are a splendid surfacing for tennis courts and floors and a desirable tunnel lining for railroads, as they help to prevent sweating of the walls and furnish a pleasing, uniform color.

Another feature of the invention is that bituminous emulsions prepared and stabilized according to the present process do not "migrate" when they are mixed with sand, then spread out in relatively thin layers and allowed to dry, as is done in roadmaking operations. "Migration" has been the source of considerable trouble when certain bituminous emulsions (such as unneutralized Braun or Montgomerie emulsions containing commercial casein or blood as stabilizers) are mixed with sand. This phenomenon involves the migration of bitumen to the surface of the sand emulsion mixture as it dries, thereby forming a thick skin of asphalt on the surface and leaving an underneath layer of sand with very little or at least insufficient binder. The cause of this action is not understood but it has been discovered that the present invention avoids the difficulty.

I have described by invention in detail, but desire that the scope of my invention shall not be limited except as specifically defined in the appended claims.

I claim:

1. An alkaline bituminous emulsion comprising bitumen dispersed in an aqueous alkaline solution, a primary emulsifying agent formed at the interface of the dispersed bitumen and the alkaline solution by the reaction of the alkali in said solution with acidic constituents naturally occurring is bituminous materials, a stabilizer formed by the addition of "calcium casein" to said alkaline aqueous solution, said emulsion being neutralized with the acidic decomposition products of milk sugars and containing the reaction products of the alkali in said solution with said acidic decomposition products, said stabilized emulsion having a pH of from 7.5 to 9.5.

2. An alkaline bituminous emulsion comprising bitumen dispersed in an aqueous alkaline solution, a primary emulsifying agent formed at the interface of the dispersed bitumen and the alkaline solution by the reaction of the alkali of said solution with acidic constituents naturally occurring in bituminous materials, a buffer, and a stabilizer formed by the addition of "calcium casein" to said alkaline aqueous solution, said emulsion being neutralized with the acidic decomposition products of milk sugars and containing the reaction products of the alkali in said solution with said acidic decomposition products, said stabilized emulsion having a pH of from 7.5 to 9.5.

3. A stable alkaline bituminous emulsion comprising bitumen dispersed in an aqueous alkaline solution, a primary emulsifying agent formed at the interface of the dispersed bitumen and the alkaline solution by the reaction of the alkali of said solution with the acidic constituents naturally occurring in the bitumen, a stabilizer comprising skimmed milk in quantities of .3 to 1.5% of the emulsion based on the dry weight of the milk, and a buffer, said alkaline emulsion being self neutralized by constituents in the milk to a pH of approximately 8.5.

4. A composition as in claim 2 in which the buffer is borax.

5. A composition as in claim 2 in which the buffer is also a preservative against putrefaction and comprises sodium arsenite.

6. A process of converting quick-breaking alkaline bituminous emulsions to stable mixing emulsions which comprises adding "calcium casein" and milk sugars to an alkaline quick-breaking emulsion, neutralizing said emulsion to a pH of from approximately 7.5 to approximately 9.5 by decomposing said milk sugars in situ in said emulsion, the emulsion being at a temperature of from approximately 100° F. to approximately 175° F. when said milk sugars are added, and controlling the neutralization by cooling the emulsion.

7. A process as defined in claim 6 in which the temperature of the stabilized emulsion is controlled so that it reaches a point approximately 100° F. by the time the alkali of said solution is neutralized to a pH of from approximately 7.5 to aproximately 9.5.

8. An alkaline bituminous emulsion comprising bitumen dispersed in an alkaline aqueous solution, a primary emulsifying agent formed at the interface of the dispersed bitumen and the alkaline vehicle by the reaction of the alkaline material in said solution with acidic constituents naturally occurring in the bitumen, and a stabilizer comprising skimmed milk in quantities of from 0.1% to 2% of the emulsion based on the dry weight of the milk, said emulsion being self-neutralized by constituents in the milk to a pH of approximately 7.5 to approximately 9.5.

CLAUDE L. McKESSON.